(12) United States Patent
Cao (10) Patent No.: US 8,661,085 B2
(45) Date of Patent: Feb. 25, 2014

(54) ADAPTATION METHOD AND ADAPTER APPARATUS BASED ON MULTIMEDIA MESSAGING SERVICE

(75) Inventor: Gang Cao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 26 days.

(21) Appl. No.: 13/259,719

(22) PCT Filed: May 24, 2010

(86) PCT No.: PCT/CN2010/073152

§ 371 (c)(1),
(2), (4) Date: Dec. 30, 2011

(87) PCT Pub. No.: WO2011/075977

PCT Pub. Date: Jun. 30, 2011

(65) Prior Publication Data

US 2013/0073635 A1     Mar. 21, 2013

(30) Foreign Application Priority Data

Dec. 24, 2009  (CN) .......................... 2009 1 0261391

(51) Int. Cl.
*G06F 15/16* (2006.01)
*G06F 7/04* (2006.01)

(52) U.S. Cl.
USPC ........... 709/206; 709/217; 709/218; 709/219; 709/224; 709/234; 726/26; 370/252; 370/253

(58) Field of Classification Search
None
See application file for complete search history.

(56) References Cited

U.S. PATENT DOCUMENTS

| | | | |
|---|---|---|---|
| 5,768,353 A * | 6/1998 | Browne | 379/115.03 |
| 7,185,103 B1 * | 2/2007 | Jain | 709/234 |
| 7,382,795 B2 * | 6/2008 | Brown et al. | 370/428 |
| 7,664,097 B2 * | 2/2010 | White et al. | 370/352 |
| 8,145,631 B2 * | 3/2012 | Riggs | 707/722 |
| 8,170,023 B2 * | 5/2012 | Rajakarunanayake et al. | 370/392 |
| 8,224,924 B2 * | 7/2012 | Andersen et al. | 709/217 |
| 2003/0119552 A1 * | 6/2003 | Laumen et al. | 455/557 |
| 2004/0111469 A1 * | 6/2004 | Manion et al. | 709/204 |
| 2008/0201318 A1 * | 8/2008 | McNew | 707/5 |
| 2009/0172552 A1 * | 7/2009 | Segel | 715/733 |
| 2010/0049349 A1 * | 2/2010 | Deng | 700/94 |
| 2010/0145932 A1 * | 6/2010 | Rook et al. | 707/722 |

FOREIGN PATENT DOCUMENTS

| | | | |
|---|---|---|---|
| CN | 1384689 A | | 12/2002 |
| CN | 1889595 | * | 1/2007 |
| CN | 1889595 A | | 1/2007 |
| CN | 101426052 A | | 5/2009 |
| WO | WO-2005/091658 A1 | | 9/2005 |

OTHER PUBLICATIONS

International Search Report issued in PCT/CN2010/073152 dated Oct. 14, 2010.

* cited by examiner

*Primary Examiner* — Joshua Joo
*Assistant Examiner* — Younes Naji
(74) *Attorney, Agent, or Firm* — Venable LLP; Robert S. Babayi (57) ABSTRACT

The present invention discloses a method and apparatus for adaptation based on the multimedia messaging service. The apparatus comprises: an integrity detecting unit for performing integrity detection for first multimedia message data to determine that the first multimedia message data is integrated; and a data import unit for import the first multimedia message data from a mobile storage apparatus into a terminal. The technical solution according to the present invention can prevent the destroyed multimedia message data from being imported into the terminal, which avoids abnormity occurring when the terminal starting a multimedia message application.

10 Claims, 7 Drawing Sheets

ADAPTATION METHOD AND ADAPTER APPARATUS BASED ON MULTIMEDIA MESSAGING SERVICE

FIELD OF THE INVENTION

The present invention relates to the communication field and, and in particular, to an adaptation method and an adapter apparatus based on the multimedia messaging service.

BACKGROUND OF THE INVENTION

Multimedia messaging service (MMS) is a short messaging service launched by mobile operators, and MMS uses the wireless application protocol (WAP) as the carrier to transmit multimedia. Its most prominent feature is being able to support the multimedia function and transfer contents and information with all-round functions, and the information includes text, image, sound, video, and other information in various multimedia formats. The multimedia messaging service can achieve instant multimedia information transfer from a mobile phone to another mobile phone, from a mobile phone to the Internet, or from the Internet to a mobile phone. As compared to the traditional short message, the multimedia message is further provided with multimedia contents such as rich colorful images, sound, animation, vibration, video, etc. in addition to basic text information, and it can be further provided with application contents such as sports news with live pictures, interesting cartoons, greeting cards with rich contents, wonderful cartoon games, etc. In addition, like mails, the multimedia message can carry other types of files, such as name card holder file, etc.

With the coming of 3G era, the information carried by the multimedia message is becoming richer and richer, and thus the size of a single multimedia message becomes bigger and bigger. Currently, the size of a single multimedia message sent by many networks has increased from 100 K to 300 K, and it is estimated that it will still increase continuously in the future. Meanwhile, this brings up a problem that since the specific space on the mobile phone terminal (this specific space is protected, i.e. the user cannot access it directly) where multimedia message data is stored is limited, if the size of a single multimedia message is very large, then the number of multimedia messages which can be received and stored by the mobile phone terminal will also be very limited, and the specific space for multimedia messages will rapidly be occupied, which affects the terminal receiving multimedia messages normally; thus, the currently stored multimedia messages have to be deleted, and once deleted, they cannot be restored forever. Therefore, a solution of storing the storage of the multimedia message data on a peripheral mobile storage device (such as T card) of the terminal is proposed according to more and more demands of user, and then the storage space of multimedia messages can be broadened to the maximum extent, but this usually brings up the following technical problems, for example:

The multimedia message data is stored on a removable storage device, and since the user can directly access the storage device, it cannot get unwritable protection, i.e. the user can delete or destroy it at will. Once the multimedia message data on the mobile storage device is destroyed, many abnormal problems will occur when a multimedia message application of the terminal is started.

SUMMARY OF THE INVENTION

As to the problem in relevant art that when the multimedia message data on the mobile storage device is destroyed, it causes abnormities to occur when a multimedia message application of the terminal is started or when re-installing the removable storage device which stores multimedia message data onto the mobile phone terminal and it may be very difficult to re-identity the multimedia messages, the present invention provides an adaptation method based on the multimedia messaging service and an adapter apparatus so as to solve at least one of the above problems.

An adapter apparatus is provided according to one aspect of the present invention.

The adapter apparatus according to the present invention comprises: an integrity detecting unit for performing integrity detection for first multimedia message data to determine that the first multimedia message data is integrated; and a data import unit for import the first multimedia message data from a mobile storage apparatus into a terminal.

An adaptation method based on the multimedia messaging service is provided according to another aspect of the present invention.

The adaptation method based on the multimedia messaging service according to the present invention comprises: performing integrity detection for first multimedia message data which needs to be imported from a mobile storage apparatus into a terminal, and determining whether the first multimedia message data is integrated; and import the first multimedia message data into the terminal in the situation where the multimedia message data is integrated.

By means of the present invention, performing integrity detection for the multimedia message data which needs to be imported from a mobile storage apparatus into a terminal solves the problem that when the multimedia message data on the mobile storage device is destroyed, it causes abnormities to occur when the multimedia message application of the terminal is started, thus the destroyed multimedia message data can be prevented from being imported into the terminal and avoids abnormities occurring when starting the multimedia message application of the terminal.

BRIEF DESCRIPTION OF THE DRAWINGS

The drawings, provided for further understanding of the present invention and forming a part of the specification, are used to explain the present invention together with embodiments of the present invention rather than to limit the present invention, wherein.

DETAILED DESCRIPTION OF THE EMBODIMENTS

The embodiments of the present invention will be described hereinafter in detail in conjunction with the drawings thereof. It needs to be noted that the embodiments of the present application and the features in the embodiments can be combined with each other if there is no conflict.

Figure 1:
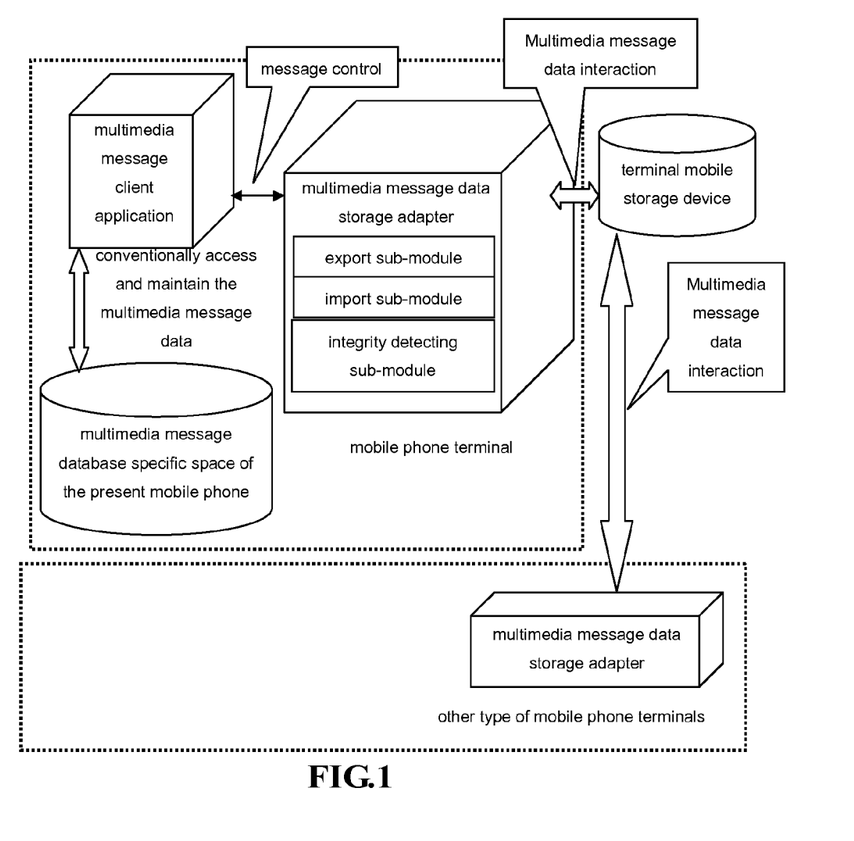
FIG. 1 is an overall structure diagram of a detachable adapter apparatus which collects multimedia messages according to the embodiments of the present invention.

FIG. 1 is an overall structure diagram of a detachable adapter apparatus which collects multimedia messages according to the embodiments of the present invention. As shown in FIG. 1, the detachable adapter apparatus which collects multimedia messages according to the embodiments of the present invention can be located in a terminal (such as a mobile phone), and the adapter apparatus (which can also be referred to as a multimedia message data storage adapter) is an independent function module relative to the multimedia message application module, and mainly imports and exports data by interacting with the multimedia message application via messages. The adapter apparatus mainly comprises: a data export unit, a data import unit, and an integrity detecting unit. With these units, the assembly and disassembly of the multimedia message data of a mobile phone can be achieved and further the multimedia message data of other types of mobile phones can be accessed.

Figure 2:
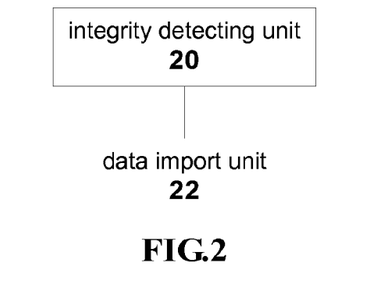
FIG. 2 is a block diagram of the structure of an adapter apparatus according to the embodiments of the present invention.

FIG. 2 is a block diagram of the structure of an adapter apparatus according to the embodiments of the present invention. As shown in FIG. 2, the adapter apparatus according to the embodiments of the present invention comprises: an integrity detecting unit 20 and a data import unit 22.

The integrity detecting unit 20 is configured to perform integrity detection for first multimedia message data to determine whether the first multimedia message data is integrated; and the data import unit 22 is configured to import the first multimedia message data from a mobile storage apparatus into the terminal.

This apparatus performs integrity detection for the multimedia message data which needs to be imported from the mobile storage apparatus into the terminal, which can prevent the destroyed multimedia message data from being imported into the terminal and avoid abnormities occurring when the multimedia message application of the terminal is started.

Figure 3:
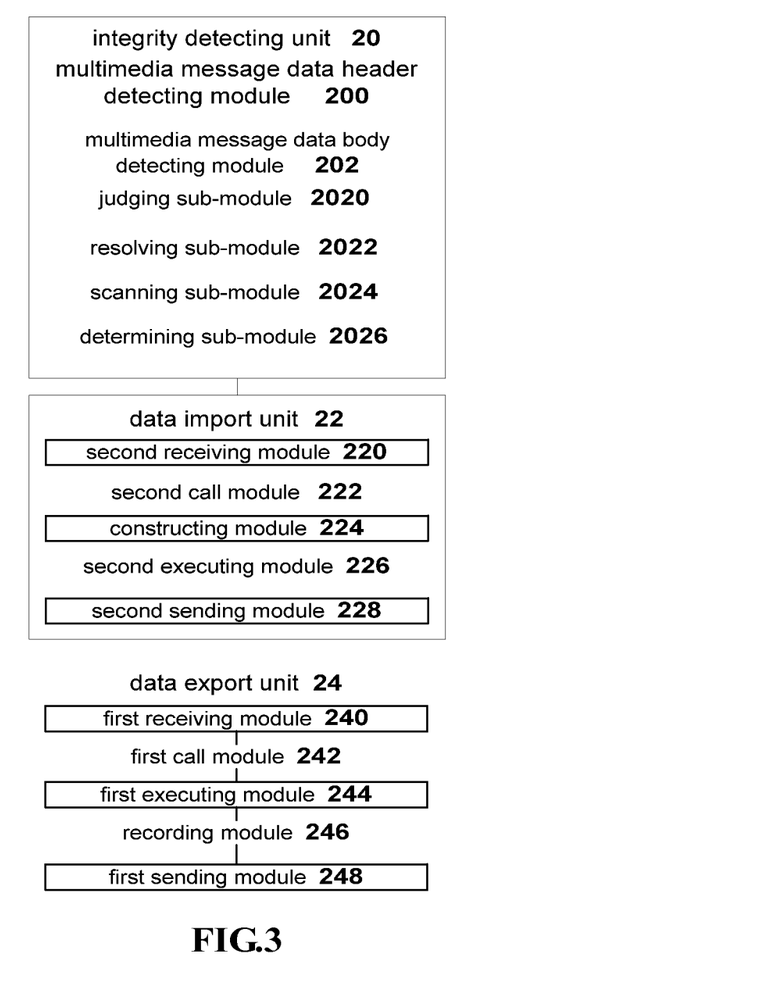
FIG. 3 is a block diagram of the structure of an adapter apparatus according to the preferred embodiments of the present invention.

Preferably, as shown in FIG. 3, the above adapter apparatus can further comprise: a data export unit 24 for exporting second multimedia message data from the terminal into the mobile storage apparatus; and an integrity detecting unit 24 for performing integrity detection for the second multimedia message data to determine whether the second multimedia message data is integrated.

In relevant art, when a mobile storage device provided with multimedia message data is moved out of the mobile phone terminal, if other multimedia messages on this mobile phone change after operations such as sending and receiving, edit, storage, deletion, etc., then at this moment, if this mobile storage device is re-installed on the mobile phone terminal, multimedia messages on the mobile storage device will be difficult to re-identify, since the index data of multimedia messages on this mobile phone changes. By means of this preferred embodiment, the integrity detecting unit performs integrity detection for the second multimedia data of the mobile storage apparatus which is moved out of the terminal, which enables the multimedia messages to be re-identified when the stored integrated second multimedia data is re-installed onto the mobile phone terminal.

Preferably, as shown in FIG. 3, the integrity detecting unit 20 can further comprise: a multimedia message data header detecting module 200 for detecting whether the data header of the multimedia message data contains predetermined key information; and a multimedia message data body detecting module 202 for detecting whether the data body of the multimedia message data contains a predetermined file, and in the situation that the predetermined file is contained, resolving the predetermined file and searching whether the predetermined file contains a predetermined content.

Preferably, as shown in FIG. 3, the multimedia message data body detecting module 202 can further comprise: a judging sub-module 2020 for judging whether the data body contains a synchronized multimedia integration language (SMIL) file; a resolving sub-module 2022 for resolving the SMIL file and acquiring a multimedia file sequence, in the situation that the output of the judging sub-module is yes; a scanning sub-module 2024 for successively scanning respective files which contain multimedia file sequences in the data body; and a determining sub-module 2026 for determining whether the content contained in the data body is integrated according to the output result of the scanning sub-module.

Preferably, as shown in FIG. 3, the data export unit 24 includes: a first receiving module 240 for receiving a data export instruction (for detailed information please refer to FIG. 4) from the terminal, wherein the data export instruction carries the following: duplication or copy indication information, the number of packets to be exported, terminal absolute paths corresponding to the packets to be exported, and terminal mailbox identifications corresponding to the packets to be exported; a first call module 242 for calling the integrity detecting unit to perform detection; a first executing module 244 for performing a duplication or copy operation for the packets to be exported; a recording module 246 for respectively recording the terminal mailbox identifications for respective packets which are exported successfully; a first sending module 248 for returning export response information to the terminal, wherein the export response information (for detailed information please refer to FIG. 5) carries the following: the number of packets which are exported successfully and identification information of the packets which are exported successfully.

Figure 4:
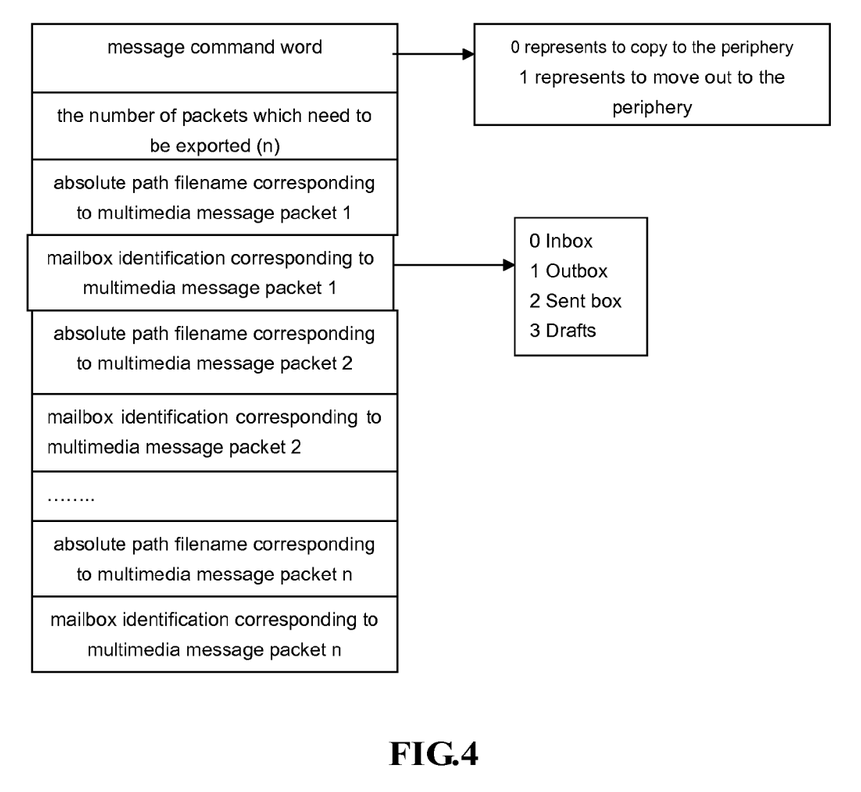
FIG. 4 is an illustration diagram of a data export message sent by a multimedia message application to an adapter apparatus according to the embodiments of the present invention.

FIG. 4 is an illustration diagram of a data export instruction sent by the multimedia message application to the adapter apparatus. As shown in FIG. 4, the instruction contains: a message command word (in which 0 represents that the data needs to be duplicated from the present mobile phone to a peripheral storage device and 1 represents that the data needs to be moved from the present mobile phone to the peripheral storage device), the number of packets which need to be exported, successively arranging the absolute path filenames and mailbox identifications on the present mobile phone corresponding to respective multimedia message packets (0 represents Inbox, 1 represents Outbox, 2 represents Sent box, and 3 represents Drafts).

Figure 5:
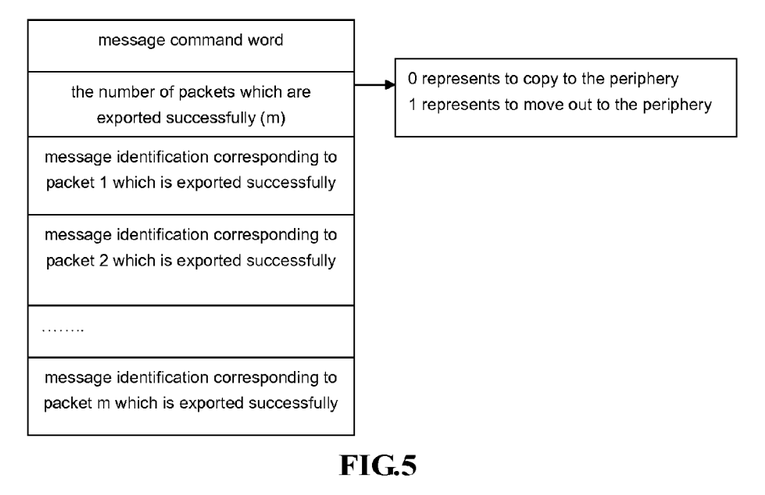
FIG. 5 is an illustration diagram of an adapter apparatus responding to a message exported by a multimedia message application according to the embodiments of the present invention.

FIG. 5 is an illustration diagram of the adapter apparatus responding to a message exported by the multimedia message application according to the embodiments of the present invention. As shown in FIG. 5, this message contains: a message command word of response, the number of packets which are exported successively, successively arranging the corresponding message IDs of the packets (i.e. identification information of the packets) which are exported successfully.

Preferably, as shown in FIG. 3, the data import unit 22 comprises: a second receiving module 220 for receiving a data import instruction (for detailed information please refer to FIG. 6) from the terminal, wherein the data import instruction carries the following: duplication or copy indication information, a path to a multimedia message specific area on the terminal, current remaining space of the multimedia message specific area on the terminal; a second call module 22 for calling the integrity detecting unit to perform detection; a constructing module 224 for constructing temporary index tables (for detailed information please refer to FIG. 8) for packets which have passed the integrity detection, wherein the temporary index tables carry the following: identification information of the packets, mailbox identifications corresponding to the packets, terminal absolute paths corresponding to the packets; a second executing module 226 for deleting the terminal mailbox identifications recorded by packets to be imported which have passed the integrity detection and for moving or copying the packets to a multimedia message specific area on the terminal; and a second sending module 228 for returning import response information (for detailed information please refer to FIG. 7) to the terminal, wherein the import response information carries the following: the number of packets which are imported successfully and the temporary index tables corresponding to the packets which are imported successfully.

Figure 6:
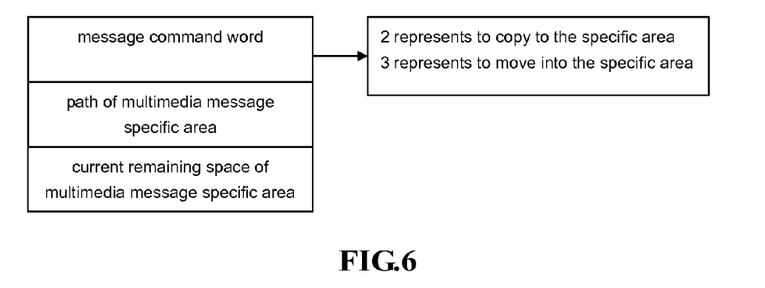
FIG. 6 is an illustration diagram of a data import message sent by a multimedia message application to an adapter apparatus according to the embodiments of the present invention.

FIG. 6 is an illustration diagram of a data import instruction sent by the multimedia message application to the adapter apparatus. As shown in FIG. 6, this data import instruction contains the following: a message command word (in which 2 represents that the data needs to be duplicated from the peripheral storage device to the present mobile phone and 3 represents that the data needs to be moved from the peripheral storage device to the present mobile phone), a path to a multimedia message specific area, the size of current remaining space of the multimedia message specific area.

Figure 7:
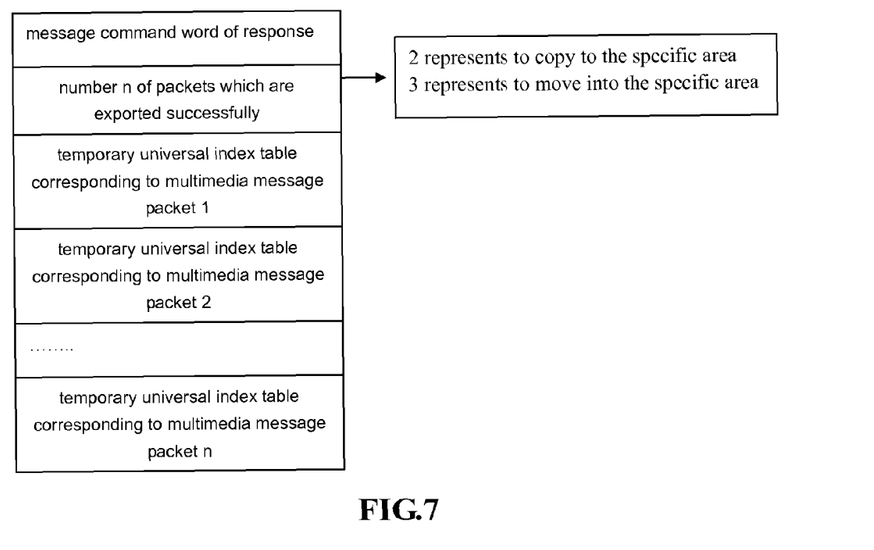
FIG. 7 is an illustration diagram of an adapter apparatus responding to a data import message according to the embodiments of the present invention.

FIG. 7 is an illustration diagram of the adapter apparatus responding to a data import message according to the embodiments of the present invention. As shown in FIG. 7, this message may contain: a message command word of response, the number of packets which are imported successively, successively arranging the corresponding temporary index tables of the packets which are imported successfully.

Figure 8:
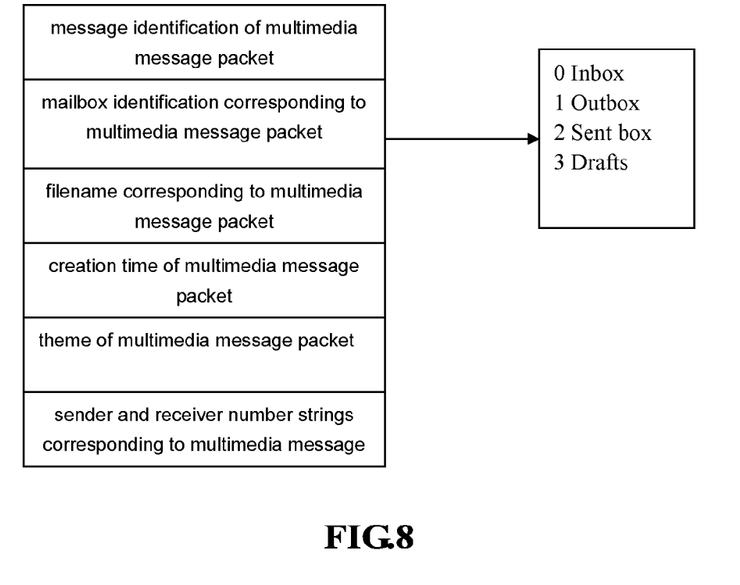
FIG. 8 is an illustration diagram of a universal temporary index table generated during the data import process of an adapter apparatus according to the embodiments of the present invention.

FIG. 8 is an illustration diagram of a universal temporary index table generated during the data import process of the adapter apparatus according to the embodiments of the present invention. As shown in FIG. 8, this universal temporary index table may contain: a message ID (i.e. packet identification information or filename information) of a multimedia message packet, a mailbox identification corresponding to the multimedia message packet, a filename corresponding to the multimedia message packet, creation time of the multimedia message packet, theme of the multimedia message packet, and sender and receiver number strings corresponding to the multimedia message packet, and the information in the above table is derived from the integrity detection.

By means of the above embodiments, the above provided apparatus can prevent the destroyed multimedia message data from being imported into the terminal and avoid abnormities occurring when the terminal multimedia message application is started. And the unified management of the imported multimedia message data can be achieved by inputting the constructed universal temporary index tables into the multimedia message application module and then adapting it into a specific index table of this terminal; thus, the multimedia messages can be re-identified when the removable storage device which stores multimedia message data is re-installed onto the mobile phone terminal.

Figure 9:
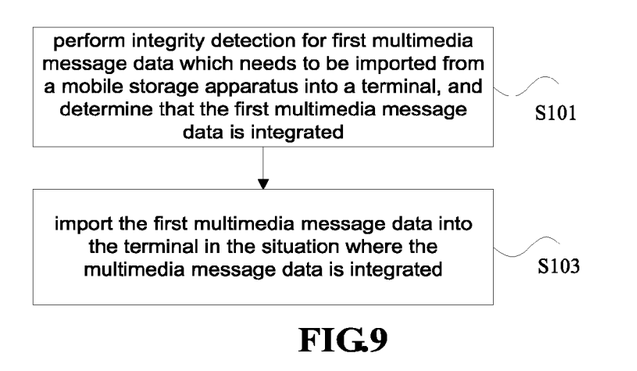
FIG. 9 is a flowchart of an adaptation method based on the multimedia messaging service according to the embodiments of the present invention.

FIG. 9 is a flow chart of an adaptation method based on the multimedia messaging service according to the embodiments of the present invention. As shown in FIG. 9, the adaptation method based on the multimedia messaging service according to the embodiments of the present invention comprises the following process (steps S101 to S103):

Step S101: performing integrity detection for first multimedia message data which needs to be imported from a mobile storage apparatus into a terminal, and determining whether the first multimedia message data is integrated; and Step S103: importing the first multimedia message data into the terminal in the situation where the multimedia message data is integrated.

By means of the above method, performing integrity detection for the multimedia message data which needs to be imported from the mobile storage apparatus into the terminal can prevent the destroyed multimedia message data from being imported into the terminal and avoid abnormities occurring when the terminal multimedia message application is started.

Preferably, the above method can further comprise the following process:

(1) performing integrity detection for second multimedia message data which needs to be imported from the terminal to the mobile storage apparatus, and determining whether the second multimedia message data is integrated; and (2) exporting the second multimedia message data into the mobile storage apparatus in the situation where the second multimedia message data is integrated.

Preferably, performing integrity detection for the imported and exported data can further include the following process: detecting whether the data header of the multimedia message data contains predetermined key information; detecting whether the data body of the multimedia message data contains a predetermined file; and resolving the predetermined file and searching whether the predetermined file contains a predetermined content in the situation where the data body of the multimedia message data contains the predetermined file.

During the practical implementation, the above resolving the predetermined file and searching whether the predetermined file contains a predetermined content can include the following process:

(1) resolving an SMIL file in the situation that the multimedia message data body contains the SMIL file and acquiring a multimedia file sequence;

(2) successively scanning respective files which contain multimedia file sequences in the multimedia message data body; and (3) determining whether the content contained in the multimedia data body is integrated according to the scanning result.

For detailed information of the above process please refer to FIG. 11.

Figure 10:
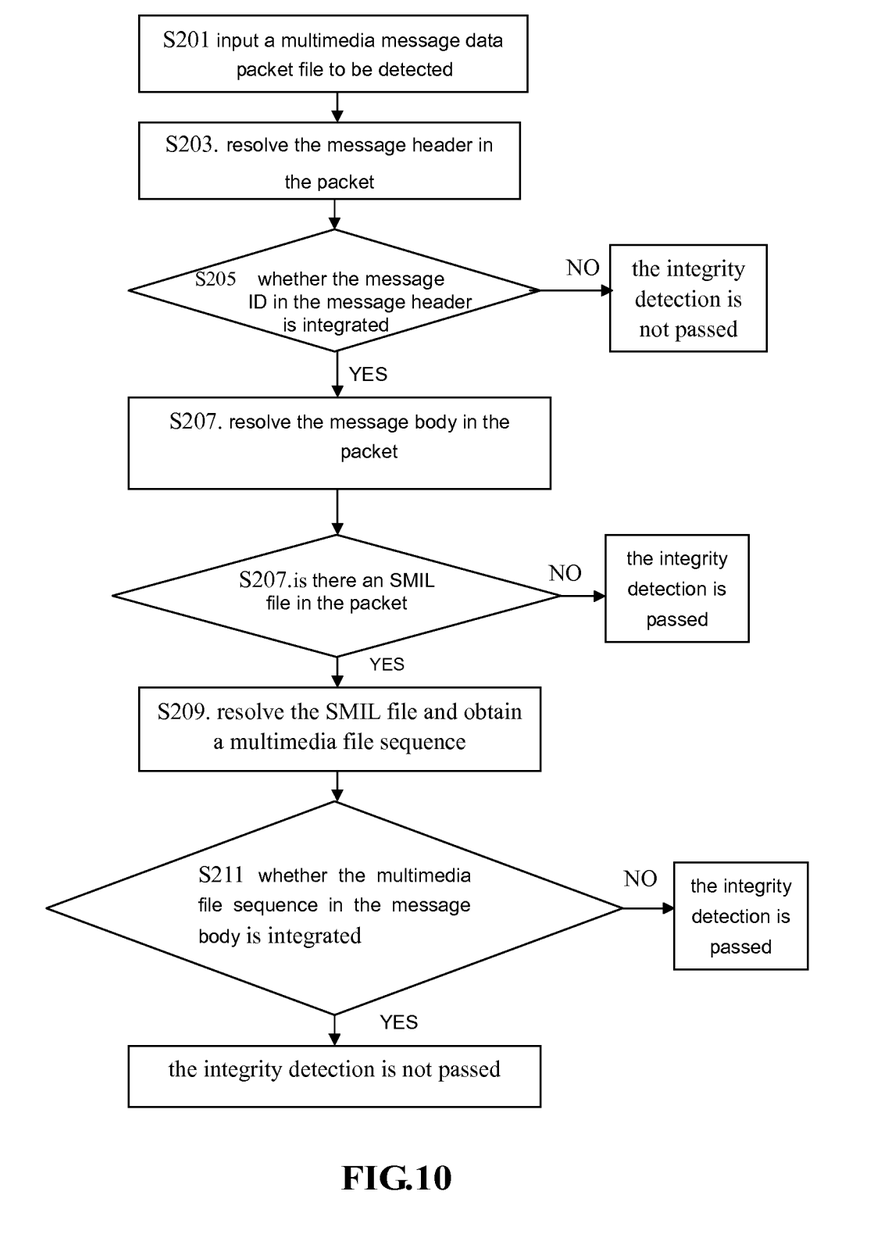
FIG. 10 is a flowchart of integrity detection performed by an adapter to the imported and exported data according to the preferred embodiments of the present invention.

FIG. 10 is a flow chart of integrity detection performed by an adapter for the imported and exported data according to the preferred embodiments of the present invention. As shown in FIG. 10, this process can include the following steps (step S201 to S211):

Step S201: inputting a multimedia message data file to be detected and loading it into the memory;

Step S203: resolving the message header in the packet;

Step S205: first detecting whether there is a message ID in the message header of a multimedia message packet, and if the message ID is incomplete, then it being judged that this data is incomplete and exiting the detection; otherwise, proceeding into step S207;

Step S207: detecting whether there is an SMIL file in the message body of the multimedia message packet, and if there is no SMIL file, then it being judged that this data is integrated and exiting the detection; otherwise, proceeding into step S209;

Step S209: resolving the SMIL file and obtaining a multimedia file sequence described in the SMIL file; and Step S211: successively scanning respective files contained in the message body of the multimedia message packet, and if it is detected that all the files in the obtained multimedia file sequence in step S209 are integrated, then it being determined that this data is integrated and exiting the detection; otherwise, it being determined that this multimedia message data is incomplete and exiting the detection.

Preferably, exporting the second multimedia data from the terminal includes the following process:

(1) receiving a data export instruction from the terminal, wherein the data export instruction carries the following: duplication or copy indication information, number of packets to be exported, terminal absolute paths corresponding to the packets to be exported, and terminal mailbox identifications corresponding to the packets to be exported;

(2) performing a duplication or copy operation for the packets to be exported;

(3) recording the terminal mailbox identification for each of the packets which are exported successfully; and (4) returning export response information to the terminal, wherein the export response information carries the following: the number of packets which are exported successfully and identification information of packets which are exported successfully.

Preferably, import the first multimedia data into the terminal includes the following process:

(1) receiving a data import instruction from the terminal, wherein the data import instruction carries the following: duplication or copy indication information, a path to a multimedia message specific area on the terminal, and current remaining space of the multimedia message specific area on the terminal;

(2) constructing temporary index tables for packets which have passed the integrity detection, wherein the temporary index tables carry the following: identification information of the packets, mailbox identifications corresponding to the packets, and terminal absolute paths corresponding to the packets;

(3) deleting the mailbox identification recorded by the packet to be imported which passes the integrity detection, and moving or copying the packet into the multimedia message specific area of terminal; and (4) returning import response information to the terminal, wherein the import response information carries the following: the number of packets which are imported successfully and corresponding temporary index tables of packets which are imported successfully.

By means of the above embodiments, an adaptation method based on the multimedia messaging service is provided. It can prevent the destroyed multimedia message data from being imported into the terminal and avoid abnormities occurring when starting a multimedia message application in the terminal. Moreover, inputting the constructed universal index tables into the multimedia message application module and then adapting it to the specific index table of this terminal can achieve the unified management of imported multimedia message data, and thus, the multimedia messages can be re-identified when the removable storage device which stores the multimedia message data is re-installed onto the mobile phone terminal.

In summary, by means of the above embodiments according to the present invention, a detachable adapter software apparatus for multimedia message data of a mobile phone is provided. The adapter apparatus not only can effectively solve the above problems existing in relevant art and also can achieve the inter-access of multimedia message data on different types of mobile phone terminals. Secondly, the embodiments of the present invention further provide an adaptation method based on the multimedia messaging service, which can prevent the destroyed multimedia message data from being imported into the terminal and avoid abnormities occurring when starting a multimedia message application of the terminal and can achieve unified management of the imported multimedia message data.

Obviously, it should be understood by those skilled in the art that, the above various modules or steps of the present invention may be implemented by use of a universal computing device; they may be centralized at a single computing device or distributed at the network composed of multiple computing devices; alternatively, they may be implemented by an executable program code of computing device, therefore which may be stored in a storage device and executed by a computing device, or which may be respectively formed as various integrated circuit modules, or multiple modules or steps of which may be formed as single integrated circuit module. Therefore, the present invention is not limited to any specific combination of hardware and software.

The foregoing is only preferred embodiments of the present invention and is not for use in limiting the protection scope thereof, and for those skilled in the art, there may be various modifications and changes to the present invention. Any modification, equivalent replacement and improvement made under the spirit and principle of the present invention should be included in the protection scope thereof.

What is claimed is:

1. An adapter apparatus comprises:
a memory storing an executable program including an integrity detecting unit, a data import unit and a data export unit;
a processor coupled to the memory configured to execute the executable program;
the integrity detecting unit coupled to the processor, to perform integrity detection for first multimedia message data; and
the data import unit coupled to the processor, to import the first multimedia message data from a mobile storage apparatus into a terminal;
the data export unit coupled to the processor, to export a second multimedia message data from the terminal;
wherein the data export unit comprises:
a first receiving module, configured to receive a data export instruction from the terminal, wherein the data export instruction carries the following: duplication or copy indication information, the number of packets to be exported, terminal absolute paths corresponding to the packets to be exported, and terminal mailbox identifications corresponding to the packets to be exported;
a first call module, configured to call the integrity detecting unit to perform detection;
a first executing module, configured to perform a duplication or copy operation for the packets to be exported;

a recording module, configured to respectively record the mailbox identification of the terminal for each of the packets which are exported successfully; and a first sending module, configured to return export response information to the terminal, wherein the export response information carries the following: the number of packets which are exported successfully and identification information of the packets which are exported successfully;

wherein the data import unit comprises:

a second receiving module, configured to receive a data import instruction from the terminal, wherein the data import instruction carries the following: duplication or copy indication information, a path to a multimedia message specific area on the terminal, and current remaining space of the multimedia message specific area on the terminal;

a second call module, configured to call the integrity detecting unit to perform detection;

a constructing module, configured to construct a temporary index table for a packet which has passed the integrity detection, wherein the temporary index table carries the following: identification information of the packet, a mailbox identification corresponding to the packet, and a terminal absolute path corresponding to the packet;

a second executing module, configured to delete the terminal mailbox identification recorded by the packet to be imported which has passed the integrity detection, and move or copy the packet into the multimedia message specific area on the terminal; and a second sending module, configured to return import response information to the terminal, wherein the import response information carries the following: the number of packets which are imported successfully and corresponding temporary index tables of packets which are imported successfully.

2. The apparatus according to claim 1, wherein the apparatus further comprises:

the data export unit coupled to the processor, to export the second multimedia message data from the terminal into the mobile storage apparatus; and the integrity detecting unit is further configured to perform integrity detection for the second multimedia message data to determine whether the second multimedia message data is integrated.

3. The apparatus according to claim 1, wherein the integrity detecting unit comprises:

a multimedia message data header detecting module, configured to detect whether a data header of the first multimedia message data contains predetermined key information; and a multimedia message data body detecting module, configured to detect whether a data body of the first multimedia message data contains a predetermined file, and configured to resolve the predetermined file and search whether the predetermined file contains a predetermined content in a situation where the data body of the first multimedia message data contains the predetermined file.

4. The apparatus according to claim 3, wherein the multimedia message data body detecting module comprises:

a judging sub-module, configured to judge whether the data body contains a synchronized multimedia integration language (SMIL) file;

a resolving sub-module, configured to resolve the SMIL file in the situation that the output of the judging sub-module is yes and acquire a multimedia file sequence;

a scanning sub-module, configured to successively scan respective files in the data body which contains multimedia file sequences; and a determining sub-module, configured to determine that the content contained in the data body is integrated according to the output result of the scanning sub-module.

5. The apparatus according to claim 2, wherein the integrity detecting unit comprises:

a multimedia message data header detecting module, configured to detect whether a data header of the second multimedia message data contains predetermined key information; and a multimedia message data body detecting module, configured to detect whether a data body of the second multimedia message data contains a predetermined file, and configured to resolve the predetermined file and search whether the predetermined file contains a predetermined content in a situation where the data body of the second multimedia message data contains the predetermined file.

6. An adaptation method based on the multimedia messaging service, comprising:

performing integrity detection for first multimedia message data which needs to be imported from a mobile storage apparatus into a terminal, and determining that the first multimedia message data is integrated; and importing the first multimedia message data into the terminal in the situation where the first multimedia message data is integrated;

exporting a second multimedia message data from the terminal;

wherein the step of exporting the second multimedia message data from the terminal comprises:

receiving a data export instruction from the terminal, wherein the data export instruction carries the following: duplication or copy indication information, the number of packets to be exported, terminal absolute paths corresponding to the packets to be exported, and terminal mailbox identifications corresponding to the packets to be exported;

performing a duplication or copy operation to the packets to be exported;

recording the terminal mailbox identification for each of the packets which are exported successfully; and returning export response information to the terminal, wherein the export response information carries the following: the number of packets which are exported successfully and identification information of packets which are exported successfully;

wherein the step of importing the first multimedia data into the terminal comprises:

receiving a data import instruction from the terminal, wherein the data import instruction carries the following: duplication or copy indication information, a path to a multimedia message specific area on the terminal, and current remaining space of the multimedia message specific area on the terminal;

constructing a temporary index table for a packet which has passed the integrity detection, wherein the temporary index table carries the following: identification information of the packet, a mailbox identification corresponding to the packet, and a terminal absolute path corresponding to the packet;

deleting the mailbox identification recorded by the packet to be imported which has passed the integrity detection, and moving or copying the packet into the multimedia message specific area on the terminal; and returning import response information to the terminal, wherein the import response information carries the following: the number of packets which are imported successfully and corresponding temporary index tables of packets which are imported successfully.

7. The method according to claim 6, wherein the method further comprises:

performing integrity detection for the second multimedia message data which needs to be imported from the terminal into the mobile storage apparatus, and determining whether the second multimedia message data is integrated; and exporting the second multimedia message data into the mobile storage apparatus in the situation where the second multimedia message data is integrated.

8. The method according to claim 6, wherein the step of performing integrity detection comprises:

detecting whether a data header of the first multimedia message data contains predetermined key information;

detecting whether a data body of the first multimedia message data contains a predetermined file; and resolving the predetermined file and searching whether the predetermined file contains a predetermined content in a situation where the data body of the first multimedia message data contains the predetermined file.

9. The method according to claim 8, wherein the step of resolving the predetermined file and searching whether the predetermined file contains a predetermined content comprises:

resolving a synchronized multimedia integration language (SMIL) file in the situation where the data body of the first multimedia message data contains the SMIL file and acquiring a multimedia file sequence;

successively scanning respective files which contain multimedia file sequences in the data body of the first multimedia message; and determining whether the content contained in the data body of the first multimedia message is integrated according to the scanning result.

10. The method according to claim 7, wherein the step of performing integrity detection comprises:

detecting whether a data header of the second multimedia message data contains predetermined key information;

detecting whether a data body of the second multimedia message data contains a predetermined file; and resolving the predetermined file and searching whether the predetermined file contains a predetermined content in a situation where the data body of the second multimedia message data contains the predetermined file.

\* \* \* \* \*